(12) United States Patent
Karri et al.

(10) Patent No.: US 11,513,762 B2
(45) Date of Patent: Nov. 29, 2022

(54) CONTROLLING SOUNDS OF INDIVIDUAL OBJECTS IN A VIDEO

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Akash U. Dhoot, Maharashtra (IN); Shailendra Moyal, Maharashtra (IN); Murali Pasala, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 17/140,411

(22) Filed: Jan. 4, 2021

(65) Prior Publication Data
US 2022/0214858 A1 Jul. 7, 2022

(51) Int. Cl.
*G06F 3/16* (2006.01)
*H04R 1/08* (2006.01)
(Continued)

(52) U.S. Cl.
CPC ............... *G06F 3/165* (2013.01); *G06V 20/40* (2022.01); *G10L 25/78* (2013.01); *H04N 9/87* (2013.01); *H04R 1/08* (2013.01); *H04S 7/303* (2013.01)

(58) Field of Classification Search
CPC ......... G06F 3/165; G06V 20/40; G10L 25/78; H04N 9/87; H04R 1/08; H04S 7/303
See application file for complete search history.

(56) References Cited

U.S. PATENT DOCUMENTS 10,694,285 B2   6/2020  McCowan
2008/0101624 A1   5/2008  Schentrup
(Continued)

FOREIGN PATENT DOCUMENTS

WO   WO-2008084725 A1 *  7/2008  ......... H04L 63/1425

OTHER PUBLICATIONS

Debruijn, "Making All the Right Noises: Shaping Sound with Audio Beamforming," MathWorks Technical Articles and Newsletters, https://www.mathworks.com/company/newsletters/articles/making-all-the-right-noises-shaping-sound-with-audio-beamforming.html, accessed Aug. 19, 2020, 5 pages.
(Continued)

*Primary Examiner* — Sunghyoun Park
(74) *Attorney, Agent, or Firm* — Andre Adkins

(57) ABSTRACT

A method for modifying a sound produced by a sound source in a video includes capturing video and audio of a scene is disclosed. Audio is captured using a microphone array. A sound source is isolated and a direction of arrival of the sound source with respect to a capture location is identified. One or more visual objects in the captured video are identified. One of the isolated sound sources is associated with one of the identified visual objects. An input identifying one of the isolated sound sources is received during playing of the captured video and audio. The input includes a command. Responsive to receiving the input, an attribute of the identified isolated sound source is modified. The input may identify a visual object associated with a sound source. A system and article of manufacture are also disclosed.

12 Claims, 7 Drawing Sheets

(51) Int. Cl.
*H04S 7/00* (2006.01)
*G10L 25/78* (2013.01)
*H04N 9/87* (2006.01)
*G06V 20/40* (2022.01)

(56) References Cited

U.S. PATENT DOCUMENTS

| | | | | |
|---|---|---|---|---|
| 2011/0051952 | A1* | 3/2011 | Ohashi | G01H 3/10 |
| | | | | 381/92 |
| 2013/0316691 | A1 | 11/2013 | Forutanpour | |
| 2017/0265016 | A1* | 9/2017 | Oh | G06V 20/40 |
| 2017/0372748 | A1* | 12/2017 | McCauley | H04N 21/439 |
| 2017/0374454 | A1 | 12/2017 | Bernardini | |
| 2018/0374495 | A1* | 12/2018 | Fienberg | H04R 1/406 |
| 2020/0296521 | A1* | 9/2020 | Wexler | H04R 25/405 |
| 2021/0035597 | A1* | 2/2021 | Eubank | G10L 19/008 |
| 2021/0286980 | A1* | 9/2021 | Stawiszynski | G06V 20/56 |

OTHER PUBLICATIONS

Adel, et al, "Beamforming Techniques for Multichannel Audio Signal Separation," International Journal of Digital Content Technology and its Application, 6(2) Dec. 2012, arXiv, https://arxiv.org/ftp/arxiv/papers/1212/1212.6080.pdf, DOI: 10.4156/jdcta.vol.6.issue20. 7, 9 pages.

Coleman, et al, "Audio object separation using microphone array beamforming," Journal of The Audio Engineering Society, 2015, https://pdfs.semanticscholar.org/da89/cca39b262f28288dbe90af325a38e3314325.pdf?_ga=2.157232568.2084617233.1593439343-478260308.1588874461, May 2015, 11 pages.

Czyzewski, "Automatic Identification of Sound Source Position Employing Neural Networks and Rough Sets," Pattern Recognition Letters 24 (2003) 921-933, Science Direct, Elsevier Science B.V., 2002, PII: S01 6 7-8 6 55 (0 2 )002 0 4- 0, pp. 921-933.

Gao, et al, "Learning to Separate Object Sounds by Watching Unlabeled Video," arXiv:1804.01665v2 [cs.CV] Jul. 26, 2018, https://arxiv.org/pdf/1804.01665.pdf, 19 pages.

Herbig, et al., "Binaural Beamforming: The Natural Evolution," Tech Topic May 2015 The Hearing Review, Apr. 22, 2015, https://www.hearingreview.com/hearing-products/accessories/components/binaural-beamforming-natural-evolution, 8 pages.

samsung.com, "See the Bigger Picture," Samsung, https://www.samsung.com/uk/big-screen-tv/, accessed Aug. 19, 2020, 1 page.

vocal.com, "Directional Beamforming Using Two Microphones," VOCAL Complete Design Solutions VoIP Voice Video Fax Data, https://www.vocal.com/beamforming-2/directional-beamforming-using-two-microphonesdirectional-beamforming-using-two-microphones/, accessed Aug. 19, 2020, 4 pages.

* cited by examiner

CONTROLLING SOUNDS OF INDIVIDUAL OBJECTS IN A VIDEO

BACKGROUND

The present disclosure relates to modifying a sound produced by a visual object in a video.

In various real world environments and in video reproductions of real world environments, there can be multiple visual objects producing sound. The visual objects may be located at a variety of locations with respect to a listener/viewer and, for this reason, sound may be perceived by the listener as arriving from different directions based on the locations of the objects. The objects may produce sound at a variety of levels of loudness. The objects may produce sound at a variety of times, such that two or more objects may simultaneously generate sound. One example is a room in which multiple people are talking.

SUMMARY

According to various embodiments, a computer-implemented method for modifying a sound produced by a sound source in a video includes capturing video and audio of a scene. The video and audio are simultaneously captured using two or more microphones at a capture location. For each of one or more sound sources in the captured audio, the sound source is isolated and a direction of arrival of the sound source with respect to the capture location is identified. One or more visual objects in the captured video are identified. One of the isolated sound sources is associated with one of the identified visual objects. The captured video and audio is played. During the playing of the captured video and audio, an input identifying one of the isolated sound sources is received. The input includes a command. Responsive to receiving the input, an attribute of the playing of the identified isolated sound source is modified.

In an embodiment, the identifying of one of the isolated sound sources during the playing of the captured video and audio includes an identification of a visual object associated with the isolated sound source.

In an embodiment, the identifying of one of the isolated sound sources during the playing of the captured video and audio includes a word or sound spoken by a user.

In an embodiment, the identifying of one of the isolated sound sources during the playing of the captured video and audio includes a gesture made by a user.

In an embodiment, the isolating the sound source and identifying a direction of arrival of the sound source with respect to the capture location includes applying a beamforming algorithm to audio signals received by the two or more microphones to thereby form a beam pattern in which a sound source located in the beam pattern is isolated with respect to sound sources outside of the pattern.

In an embodiment, the isolating the sound source and identifying a direction of arrival of the sound source with respect to the capture location includes applying a beamforming algorithm to audio signals received by the two or more microphones to thereby form a beam pattern in which a sound source located in the beam pattern is isolated with respect to sound sources outside of the pattern, and responsive to the sound source moving from a first position to a second position, changing parameters of the beamforming algorithm to steer the beam so that the sound source remains located in the beam pattern at the second position.

In an embodiment, the playing the captured video and audio includes playing the captured audio and video on a augmented reality device.

In an embodiment, the associating one of the isolated sound sources with one of the identified visual objects includes determining whether an estimated position of the one isolated sound source is substantially the same as the one identified visual object and if the estimated positions are substantially the same, associating the one isolated sound sources with the one identified visual object.

In an embodiment, a sound produced by a sound source associated with a visual object is continuously isolating during a time period in which the visual object first moves towards and then away from a relative position of a user; and the modifying an attribute of the playing of the identified isolated sound source includes: changing pitch of the continuously isolated sound source as the visual object first moves towards and then away from a user, wherein the pitch changes from a higher pitch as the visual object approaches the user to a lower pitch as the visual object moves away from the user, thereby simulating a Doppler effect.

Various embodiments are directed to a computer system and an article of manufacture or computer program product for modifying a sound produced by a sound source in a video.

The above summary is not intended to describe each illustrated embodiment or every implementation of the present disclosure.

Figure 1:
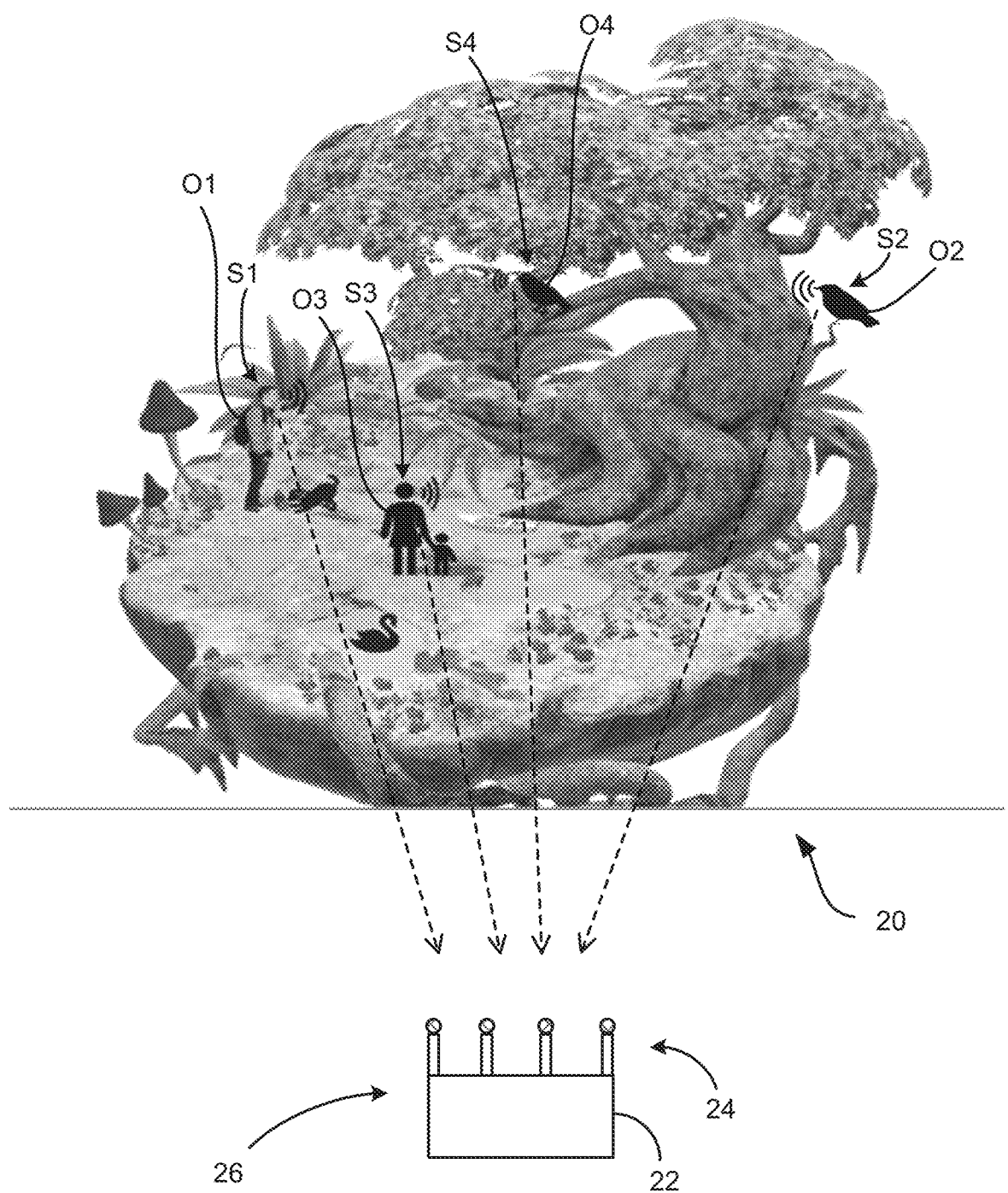
FIG. 1 illustrates an outdoor scene that includes visual objects producing sounds and a device for capturing audio and video disposed at a capture location according to various embodiments.

The same numbers may be used in the Figures and the Detailed Description to refer to the same devices, parts, components, steps, operations, and the like. While the concepts and embodiments described in this disclosure are amenable to various modifications and alternative forms, specifics thereof have been shown by way of example in the drawings and will be described in detail. It should be understood, however, that the intention is not to limit the claims to the particular embodiments described. On the contrary, the intention is to cover all modifications, equivalents, and alternatives falling within the spirit and scope of the invention.

DETAILED DESCRIPTION

In various real world environments and in video reproductions of real world environments, there can be multiple visual objects producing sound. The visual objects may be located at a variety of locations with respect to a listener/viewer and, for this reason, sound may be perceived by the listener as arriving from different directions based on the locations of the objects. The objects may produce sound at a variety of levels of loudness. The objects may produce sound at a variety of times, such that two or more objects may simultaneously generate sound. One example is a room in which multiple people are talking.

In a real world environment, the person may be talking loudly over another and a listener may have difficulty hearing the person speaking with the softer voice. The listener may be able to move closer to a person in order to be able to better hear the person. The listener may also be able to ask the speaker to repeat what was said.

In contrast to a real world environment, if a person is viewing a video of an environment containing multiple objects at multiple locations producing sound at various levels of loudness at different times, the listener-viewer may not be able to hear (or hear clearly) the sound generated by a particular object because of sounds simultaneously generated by other objects. In addition, the listener may not wish to hear the sound generated by a particular object because of a personal preference. Unlike when the listener is present in the real world environment, the listener-viewer of a video may not be able to take steps to reduce or decrease the volume of one object with respect to another object. For example, reducing the volume reduces the loudness of all sound producing objects.

According to various embodiments, a listener/viewer of a video/audio media is provided with a capability to selectively control attributes of the sound generated by different objects in the video, such as pausing, resuming, muting, unmuting, or changing the volume of the sound of an individual visual object in the video.

FIG. 1 illustrates a three dimensional (3D) outdoor scene 20. The scene 20 includes visual objects O1, O2, O3, and O4 that are capable of producing sounds. A visual object may be a person, animal, an inanimate object, such as a crackling fire, or any other object having a visual appearance that produces sound. The visual objects O1, O2, O3, and O4 may be respectively identified as a sound sources S1, S2, S3, and S4. FIG. 1 also shows a device 22 for capturing audio and video. disposed at a capture location 26. The device 22 includes an array of microphones 24. Sound produced by sound sources S1, S2, S3, and S4 may be detected by the array of microphones 24.

The array of microphones 24 may be attached to the device 22, such as around the frame of the device. In other embodiments, the array of microphones 24 may be a separate apparatus or be included in one or more separate structures at or near the capture location 26. The array of microphones 24 includes two or more microphones suitable for use in audio beamforming. The array of microphones 24 may include any suitable number of microphones, e.g., 2, 4, 6, 8, 12, or 24. The array of microphones 24 may be arranged in any suitable pattern. The array of microphones 24 when operated in conjunction with signal processing software may capture sound coming from a particular direction with a high signal-to-noise ratio with respect to any sounds coming from other directions, for example, in a 60° lobe, which may be referred to as a "beam." The microphones in the array may be separated from one another by any suitable distance. In an embodiment, the device 22 may be a mobile device, such as a smart phone or video recorder. The device 22 may include components of a computer system, such as the computer system shown in FIG. 6, which is further described herein.

Figure 2:
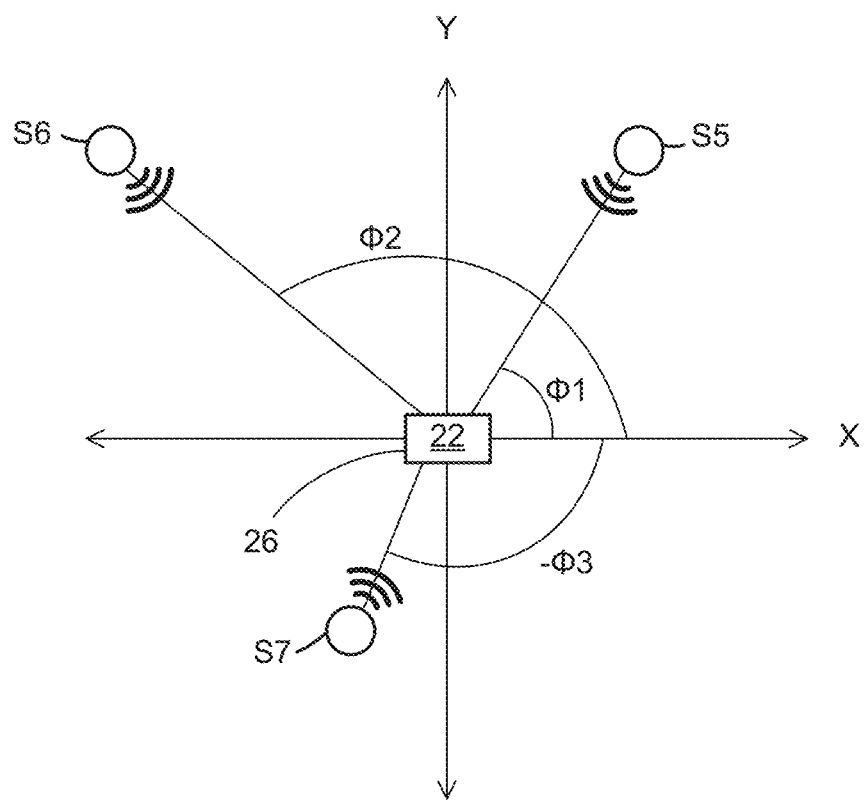
FIG. 2 is a plan view of a capture device at a capture location and sound sources according to various embodiments.

FIG. 2 is a 2D plan view of a capture device 22 at a capture location 26. Sound sources S5, S6, and S7 are also shown in FIG. 2. A cartesian coordinate system is depicted to illustrate angles $\Phi1$, $\Phi2$, and $-\Phi3$. A direction of arrival (DOA) of sound from a sound source with respect to the capture location may be defined by these angles. For example, the direction of arrival of sound from sound source S5 may be defined in 2D space by $\Phi1$. The cartesian coordinate system of FIG. 2 may be extended to 3D space. Accordingly, the direction of arrival of sound from a sound source with respect to the capture location may be defined by two angles or by a vector. In this way, a sound source with respect to the capture location may be defined above, below, or on the same plane as the capture device 22, or to the left or right of capture device 22. For example, referring to FIG. 1, sound source S2 may be defined by angles or a vector indicating that it originates above and to the right of capture device 22. In the example of FIG. 2, an array of beamforming microphones may define a beam 45°-60° wide (not shown) such that sound from S5 may be captured in isolation from the sounds of S6 and S7, which are outside of the beam. Similarly, two additional beams may be formed to isolate sound sources S6 and S7.

While the example of FIG. 1 shows sound sources that are produced by visual objects in the scene 20 captured as video by the captured device 22, it should be appreciated that in some embodiments, the array of microphones 24 may detect one or more sound sources that are not part of the scene 20 and are not captured as video. For example, in FIG. 2, visual objects S5 and S6 may be captured as video, but visual object S7 may be out of the field of a camera and not captured as video. As one example, the visual objects S5 and S6 may be athletes on a playing field or actors on a stage, and the visual object S7 may be one or more persons in the audience seated behind a person sitting at the capture location 26 using the capture device 22 to capture audio and video of a cricket match or a play.

The visual objects/sound sources depicted in FIG. 1 and the sound sources depicted in FIG. 2 may be stationary or may move to different positions with the passage of time. As such, the direction of arrival of sound from a sound source with respect to the capture location may be different at different times. In other words, the angles or vector defining the direction of arrival of sound from a sound source may vary with time. Similarly, it is not required that the capture location 26 be fixed or static. The capture location 26 may change with the passage of time. As such, the direction of arrival of sound from a sound source with respect to two different capture locations will be different even if the sound source is stationary, but the capture location 26 changes.

Figure 3:
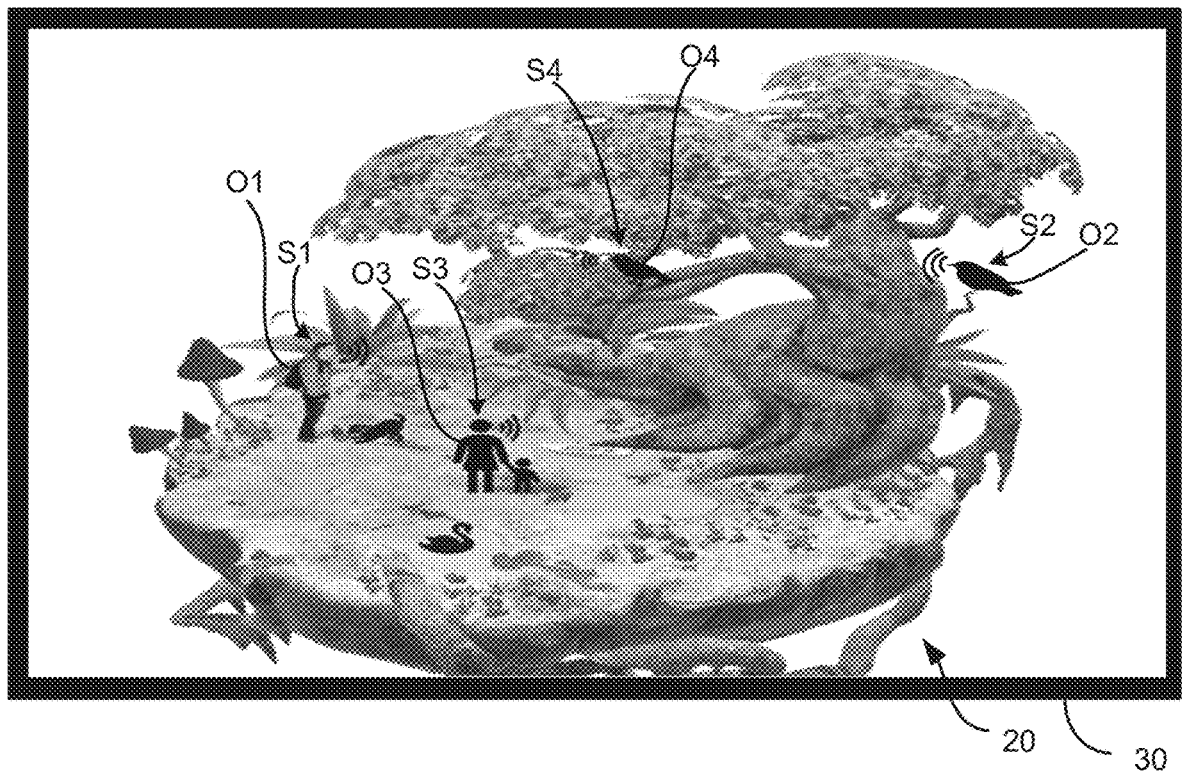
FIG. 3 illustrates a display device and a user viewing and listening to video and audio rendered by the display device according to various embodiments.
Figure 3:
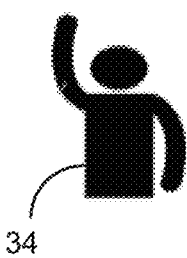

FIG. 3 illustrates a display device 30 and a viewer/listener (user) 34. The display device 30 may be a big screen television (TV) playing two dimensional (2D) rendering of the video and audio of the outdoor scene 20. In addition to a display screen and one or more speakers (not shown) for playing audio, the display device 30 may be equipped with sensors for receiving audible commands from a user/viewer 34, e.g., microphone and speech-to-text processing capability. The display device 30 may have a plurality of speakers. The speakers of the display device 30 may be capable of causing particular sounds to appear to originate from a variety of different locations. A speaker may be located at the same location as or different location from the display device. The display device 30 may be equipped with sensors for receiving gesture commands from the user/viewer 34, e.g., a camera and machine vision/image recognition capability. The display device 30 may be equipped with Bluetooth or other wireless communication capability for communication with a user worn or hand held device such as an augmented reality (AR) head set, a virtual reality (VR) headset, a heads up display head set, or smart glasses, such as Google Glass®. In various embodiments, an AR head set or a VR headset may be the display device 30. In an embodiment, the display device 30 may have large or very large screen along the lines of the scale depicted in FIG. 3, although this is not essential.

Figure 4:
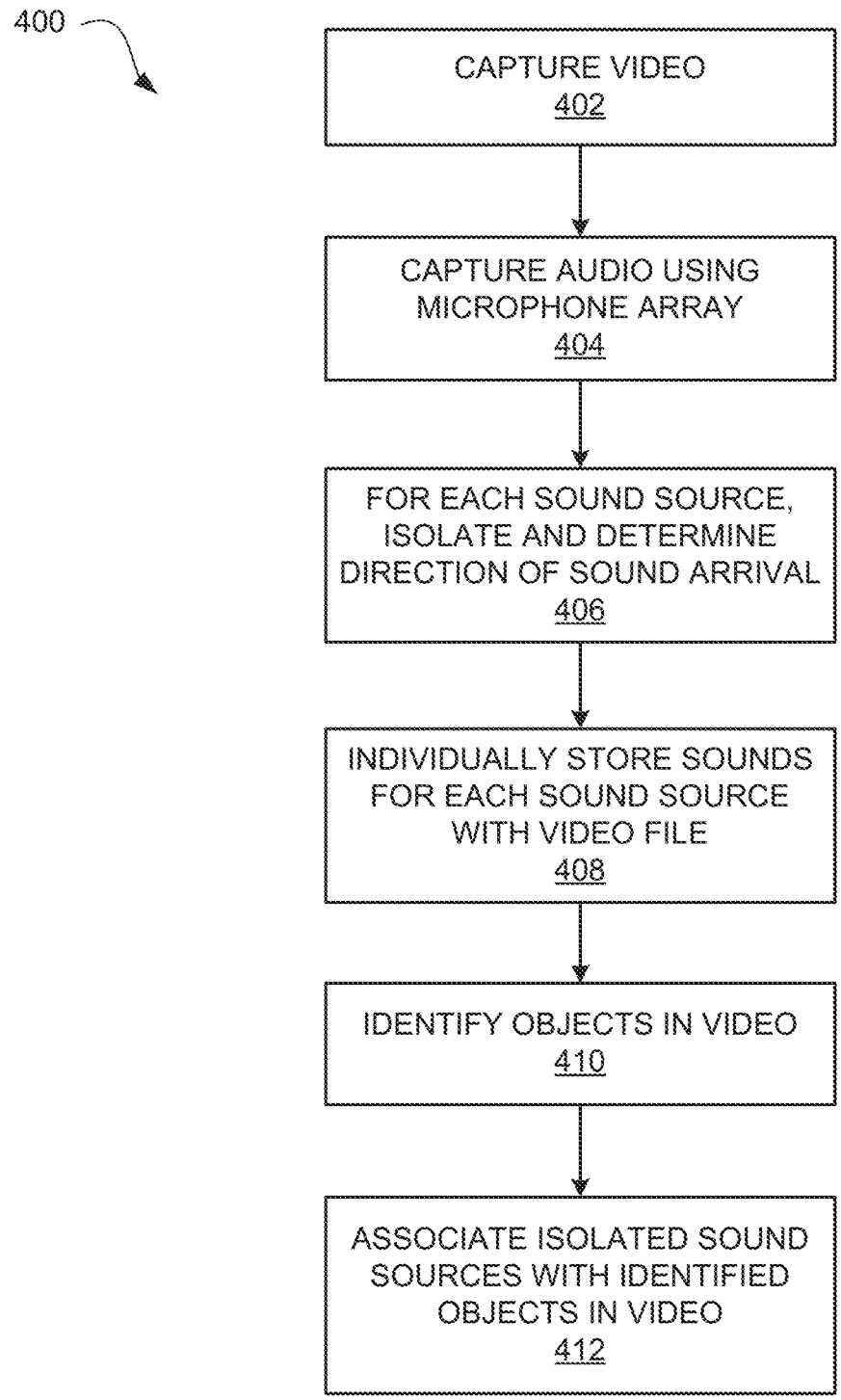
FIG. 4 is a flow chart of an example of a process for processing audio and video according to one or more embodiments.

FIG. 4 is a flow chart of an example of a process for processing audio and video according to one or more embodiments of the invention. At 402, video of a scene is captured using a video capture device, e.g., capture device 22. The video is captured at a known capture location. In an embodiment, one or more capture locations may be determined using a GPS capability of a capture device 22. In an embodiment, a capture location may be an assumed location or a user may input the location. Once an initial location is established, a new or subsequent location may be determined using an accelerometer.

At 404, audio is captured with an audio capture device, which may be the same device as the video capture device. The audio is captured simultaneously with the capturing of the video. The audio is captured at the capture location using an array of beamforming microphones. In an embodiment, the array of beamforming microphones are attached to the capture device 22. The audio that is captured is the audio produced by objects in the video. Audio may also be captured that is produced by objects not in the video, such as behind or to the side of the capture device 22, i.e., opposite or to the side of a field of view of a camera.

At 406, the captured sound sources are isolated and, for each isolated sound source, a direction of arrival with respect to the capture location is identified. Audio signals from a source are received by individual microphones of the microphone array at different times. A beamforming algorithm is applied to audio signals received by the microphone array. A beamforming algorithm may also be referred to as a spatial filtering algorithm. In one or more embodiments, any one or more of a variety of known or spatial filtering algorithms may be used. For example, a beamforming algorithm may be applied to a microphone array in an additive method in which the signals are filtered and summed to achieve an output. In another approach, a beamforming algorithm may employ a differential technique in which the microphones are closely spaced so the array is sensitive to the derivative of the sound pressure. In yet another approach, an eigenbeamforming method may be used that is based on decomposing the sound field onto orthogonal basis functions. According to various embodiments, the beamforming algorithm employed may use time-delay estimation, spatial spectral estimation, or sound field analysis. In various embodiments, a beamforming algorithm may apply a filter to each microphone signal in the array. A directivity pattern (beam pattern) is constructed by weighting the filters. A directivity pattern applied to the audio signals received by the microphone array may be used to obtain isolated sound from a particular sound source with a high signal-to-noise ratio with respect to any sounds coming from other directions. Moreover, by changing algorithm parameter values, such as filter weights, the beam may be moved so that the direction of sounds that are isolated can be changed. Moving the beam permits sound sources in different locations to be isolated. Moving the beam also permits a sound source associated with a particular visual object to be isolated even as the object changes position, e.g., as the object moves from the left side to the right side of a scene. Thus, processing signals from the microphone array using a beamforming algorithm allows a sound source to be isolated and its direction of arrival (DOA) to be estimated. The DOA is metadata about a sound source. In addition, this processing may be used to estimate position in a scene and distance (from the capture device) metadata about a sound source.

Also at 406, once a sound has been isolated from a sound source it may be classified based on its sound characteristics. For example, a speech recognition machine learning model may classify a human voice according to gender and distinguish between an adult voice and a child voice. As another example, a speech recognition model may classify a sound as being produced by a particular animal, e.g., a bird. As yet another example, a speech recognition model may classify a sound as a crowd noise, e.g., cheering, clapping, etc. The classification of a sound may be a type of metadata. Spoken words may be determined using speech-to-text and natural language processing algorithms. Spoken words may be used in the classifying a human visual object.

At 408, the captured audio and video is stored in a memory. The captured audio may be stored separately for each sound source in individual tracks or layers. The captured audio tracks or layers may be stored together with the captured video. The captured audio may be timewise or temporally aligned with the captured video. The captured audio and video may be stored together with associated metadata.

At 410, the content of the captured image is analyzed using a computer vision algorithm. Visual objects are identified and their relative position in the image is determined. Visual objects may be classified by type and the type may be stored as metadata with the object. Some example types include person, including gender and estimated age of the person. Other example types include animal, including species and estimated age of the animal. Other example types include inanimate objects, e.g., sound of waves or water flowing in a stream.

At 412, one or more isolated sound sources may be associated or aligned with an identified visual object. If the relative position of an object in a scene is substantially the same as the estimated position of a sound source, the visual object may be associated with the sound source. Referring to FIG. 1, it can be seen that the positions of objects O1, O2, O3, and O4 are substantially the same as, respectively, sound sources S1, S2, S3, and S4. Accordingly, for example, object O1 may be associated with sound source S1. Metadata for the visual object may be compared with metadata for the sound source to provide a confidence indication for the association. For example, if object metadata indicates the object O1 is a bird and sound source metadata indicates the sound S1 is a bird sound, confidence for the association may be increased.

Figure 5:
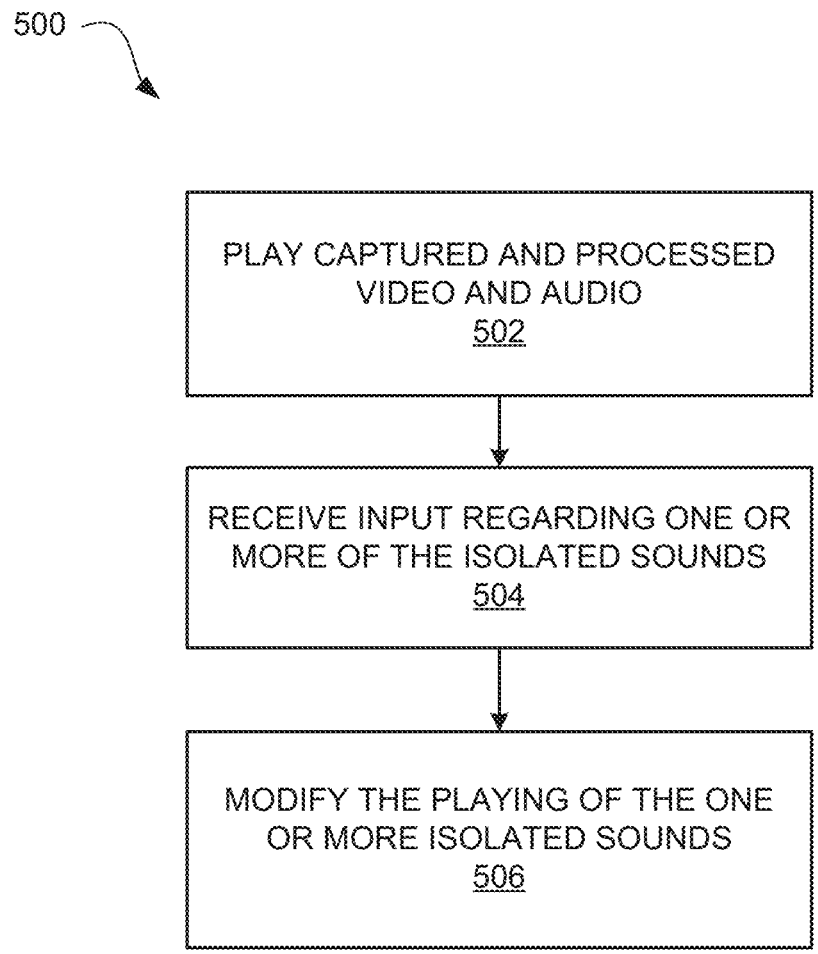
FIG. 5 is a flow chart of a process for controlling audio and video being played according to one or more embodiments.

FIG. 5 is a flow chart of a process for controlling audio and video being played or replayed according to one or more embodiments. At 502, video and audio captured and processed according to embodiments described herein is played. When the captured video and audio is played on display device 30, sounds produced from the speakers may appear to a listener to originate in different locations, e.g., the sound from a sound source may appear to arrive from the left or right, of above or below a listener.

At 504, an input is received during the playing of the captured video and audio. The input may identify one of the isolated sound sources. The input may include a command or instruction for modifying the playing of the identified isolated sound source, i.e., changing an attribute. For example, the command may be an instruction to pause, resume, mute, unmute, or change the volume of the sound source. The command or instruction may identify an individual sound source according to its perceived DOA. For example, the command may indicate that a sound arriving from above and to the left of the viewer/listener (user) be muted. In addition, the instruction may identify an individual sound source according to the visual object it is associated with. For example, the command may indicate that the sound that is perceived to be arriving from visual object O3 (a person seated in a boat in FIG. 3) be increased in volume. In addition to inputting an instruction into a conventional input device like a remote control, in various embodiments, the instruction may be a voice command or a gesture command. For example, the user may speak "mute the bird in the upper right." It is not required that a voice command be a word or that it be spoken. For instance, a non-word sound (e.g., "shhh") or a hand clap may be a "voice command." Audible commands may be determined using speech-to-text and natural language processing algorithms. As another example, the user may use their arm, hand, finger, or a combination of arm, hand, or finger to make a pointing gesture that points in a direction, which may be determined using an image processing or computer vision algorithm. The user may point to the left and say "mute" to cause all sounds with a DOA from the left to be muted. Alternatively, the system may be trained to recognize particular types of gesture so that the user may point to the left with a particular gesture without speaking and that gesture alone causes all sounds with a DOA from the left to be muted. The user may point at visual object O3 and say "make louder" to cause the volume of sound source S4 to be increased. As yet another example, the user watching a cricket match may speak "mute the crowd behind me" to mute crowd noise that originates from a sound source not being displayed on the display device 30.

In some embodiments, a command can include an instruction to change the direction of arrival (DOA) of a sound. In a related embodiment, a command can include an instruction to change the user's position with respect to one or more of the sounds, for example, from a user position on the left side to a user position on the right side of large display device 30 in FIG. 3. This may be accomplished by changing the DOA of all sounds.

In an embodiment, a doppler effect may be produced with respect to one of the isolated sounds. As a visual object moves from one side to the other of display device 30, it may visually appear to approach the user and then move away from the user. As the visual appearance of the moving object changes, the sound source associated with an object may be controlled to exhibit a higher pitch as the object approaches the user and a lower pitch as the object moves away from the user.

As mentioned, FIG. 1 illustrates a 3D scene 20 and FIG. 3 illustrates a display device 30 playing 2D rendering of the video and audio of the outdoor scene 20. In other embodiments, video of a captured scene may be rendered in 3D. As one example, a user may wear a VR headset or goggles to view a captured video of a scene in 3D. In an embodiment, when a user moves about in a 2D or 3D environment, the DOA of sounds from sound sources may be modified in a manner consistent with the user's movement. For example, when a user moves closer to or farther from a sound source, or moves to the left or right with respect to a sound source, the DOA of the sound source may be adjusted. As distance from a sound source is increased or decreased, the source's volume may be correspondingly decreased or increased.

In an embodiment, an instruction for modifying the playing of the identified isolated sound source may be input or captured via AR or VR glasses. The AR or VR glasses may be in communication with the display device 30. The AR or VR glasses may detect an eye gaze direction of a user that coincides with a spoken command, such as "mute." In this example, an isolated audio source corresponding with the direction of the eye gaze would be muted. In another example, the augmented reality glasses may detect a user's finger that is positioned in front of the glasses that appears to touch or points at an object on the display device 30. When this type of action is detected and coincides with a spoken command, such as "louder," the volume of the sound source associated with the displayed object is increased.

At 506, responsive to receiving an input described with respect to 504, the playing of the isolated sound source identified in the command or instruction is modified according to the command.

Figure 6:
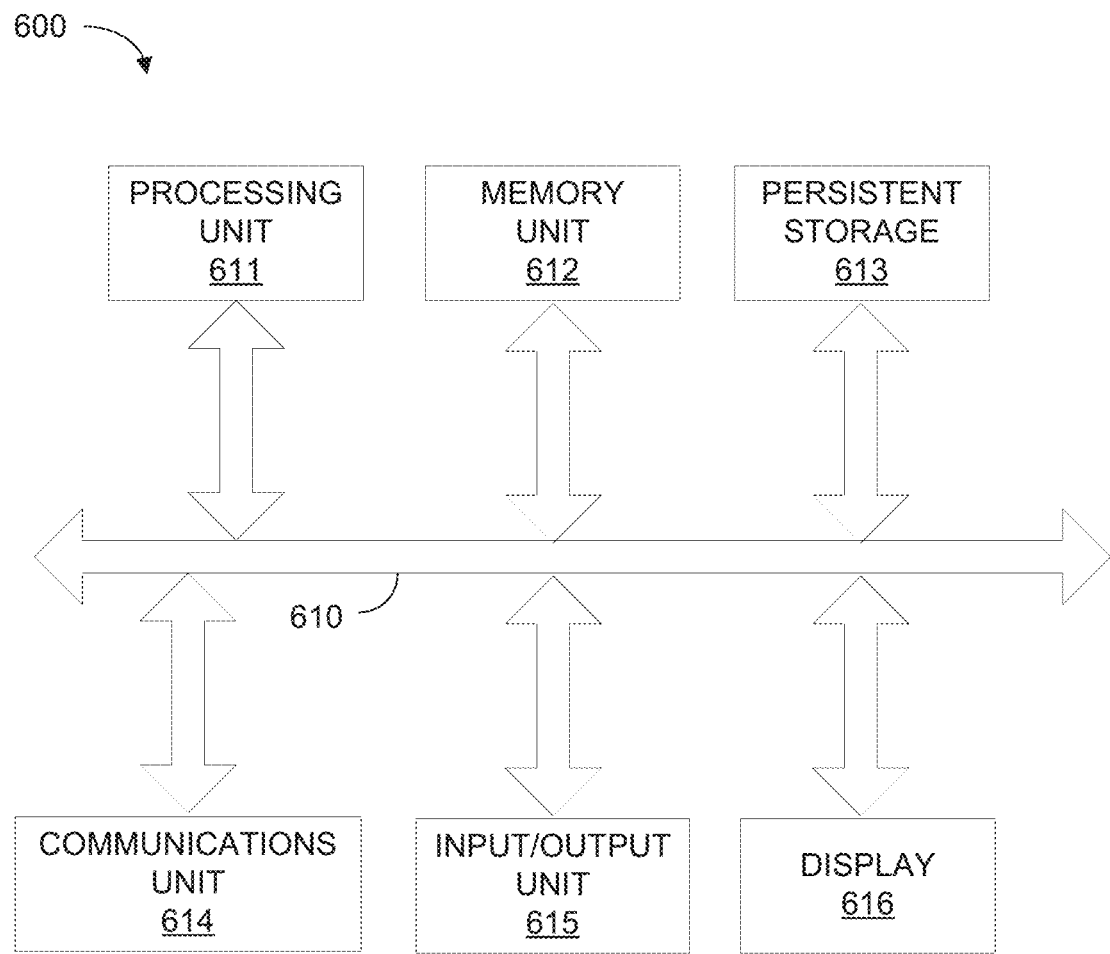
FIG. 6 is a block diagram illustrating a computer system which may be used as a component of a capture device or a display device according to various embodiments.

FIG. 6 is a block diagram illustrating a computer system 600 which may be used as a component of a capture device or a display device, e.g., capture device 20 or display device 22, according to various embodiments. As shown, a computer system 600 includes a processor unit 611, a memory unit 612, a persistent storage 613, a communications unit 614, an input/output unit 615, a display 616 and a system bus 610. The processor unit 611 may be digital signal processor (DSP). Computer programs are typically stored in the persistent storage 613 until they are needed for execution, at which time the programs are brought into the memory unit 612 so that they can be directly accessed by the processor unit 611. The processor unit 611 selects a part of memory unit 612 to read and/or write by using an address that the processor 611 gives to memory 612 along with a request to read and/or write. Usually, the reading and interpretation of an encoded instruction at an address causes the processor 611 to fetch a subsequent instruction, either at a subsequent address or some other address. The processor unit 611, memory unit 612, persistent storage 613, communications unit 614, input/output unit 615, and display 616 interface with each other through the system bus 610.

Figure 7:
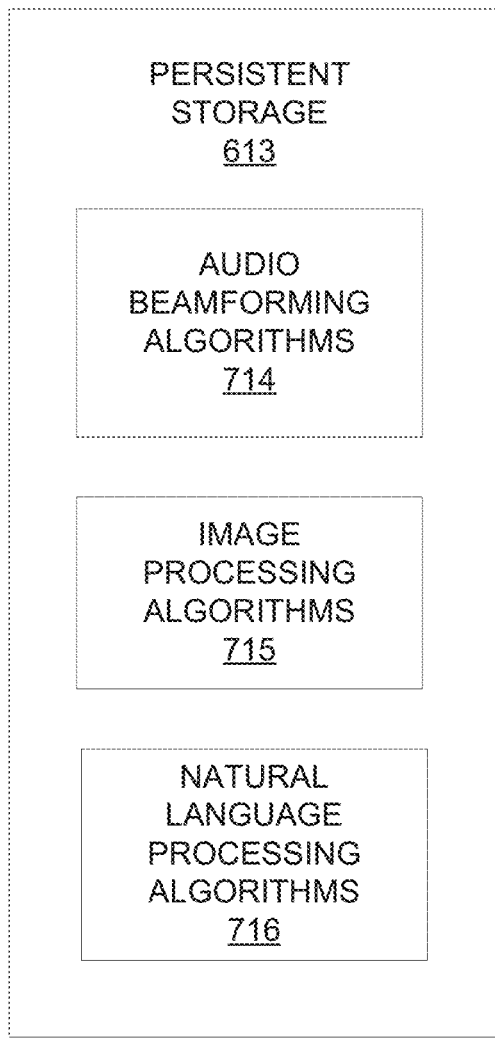
FIG. 7 is a block diagram of a persistent storage of the computer system of FIG. 6.

FIG. 7 is a block diagram of a persistent storage 613 of the computer system 600 of FIG. 6. In various embodiments, the persistent storage 613 may store computer readable program instructions in the form of a program or module 714 for performing one or more audio beamforming algorithms. As one example, the program 714 may be used to isolate sound sources in captured audio. As another example, the program 714 may be used to determine DOA and distance of captured audio.

In various embodiments, the persistent storage 613 may store computer readable program instructions in the form of a program or module 715 for performing one or more image processing algorithms. As one example, the program 715 may be used to recognize and identify visual objects in captured video and their movements. As another example, the program 715 may be used to recognize and identify visual gestures made by a user listening to captured audio and viewing captured video, e.g., commands or instructions.

In various embodiments, the persistent storage 613 may store computer readable program instructions in the form of a program or module 716 for performing one or more natural language processing algorithms. For example, the program 716 may be used to determine the meaning of words spoken in captured audio or words spoken by a user listening to captured audio and viewing captured video, e.g., commands or instructions.

Aspects of the present disclosure may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for modifying a sound produced by a sound source in a video, comprising:
    capturing video and audio of a scene, wherein the video and audio are simultaneously captured at a capture location;
    for each of one or more sound sources in the captured audio, isolating the sound source and identifying a direction of arrival of the sound source with respect to the capture location;
    identifying one or more visual objects in the captured video;
    associating one of the isolated sound sources with one of the identified visual objects;
    isolating continuously a sound produced by the sound source associated with the one or more visual objects as the visual object first moves towards then away from a relative position of a user;
    playing the captured video and audio;
    receiving an input identifying one of the isolated sound sources during the playing of the captured video and audio, wherein the input includes a command;
    responsive to receiving the input, modifying an attribute of the playing of the identified isolated sound source, modifying the attribute including changing pitch of the continuously isolated sound source as the visual object first moves towards then away from the relative position of the user to simulate a Doppler effect.

2. The method of claim 1, wherein the identifying one or more visual objects in the captured video includes identifying a visual object associated with the isolated sound source.

3. The method of claim 1, wherein the isolating the sound source and identifying a direction of arrival of the sound source with respect to the capture location further comprises:
    applying a beamforming algorithm to audio signals received by two or more microphones at the capture location thereby forming a beam pattern in which a sound source located in the beam pattern is isolated with respect to sound sources outside of the pattern.

4. The method of claim 3, further comprising:
    responsive to the sound source moving from a first position to a second position, changing parameters of the beamforming algorithm to steer the beam so that the sound source remains located in the beam pattern at the second position.

5. The method of claim 1, wherein the playing the captured video and audio includes playing the captured audio and video on an augmented reality device.

6. A computer system comprising:
    a processor; and
    a memory communicatively coupled with the processor, wherein the memory is encoded within instructions for modifying a sound produced by a sound source in a video that when executed by the processor perform operations comprising:
        capturing video and audio of a scene, wherein the video and audio are simultaneously captured at a capture location;
        for each of one or more sound sources in the captured audio, isolating the sound source and identifying a direction of arrival of the sound source with respect to the capture location;
        identifying one or more visual objects in the captured video;
        associating one of the isolated sound sources with one of the identified visual objects;
        isolating continuously a sound produced by the sound source associated with the one or more visual objects as the visual object first moves towards then away from a relative position of a user;
        playing the captured video and audio;
        receiving an input identifying one of the isolated sound sources during the playing of the captured video and audio, wherein the input includes a command;
        responsive to receiving the input, modifying an attribute of the playing of the identified isolated sound source, modifying the attribute including changing pitch of the continuously isolated sound source as the visual object first moves towards then away from the relative position of the user to simulate a Doppler effect.

7. The computer system of claim 6, wherein the identifying one or more visual objects in the captured video includes identifying a visual object associated with the isolated sound source.

8. The computer system of claim 6, wherein the isolating the sound source and identifying a direction of arrival of the sound source with respect to the capture location further comprises:
    applying a beamforming algorithm to audio signals received by two or more microphones at the capture location thereby forming a beam pattern in which a sound source located in the beam pattern is isolated with respect to sound sources outside of the pattern.

9. The computer system of claim 6, further comprising:
    responsive to the sound source moving from a first position to a second position, changing parameters of the beamforming algorithm to steer the beam so that the sound source remains located in the beam pattern at the second position.

10. A computer program product including a computer readable storage medium having computer readable program instructions stored thereon for causing a processor to perform operations for modifying a sound produced by a sound source in a video comprising:
    capturing video and audio of a scene, wherein the video and audio are simultaneously captured at a capture location;
    for each of one or more sound sources in the captured audio, isolating the sound source and identifying a direction of arrival of the sound source with respect to the capture location;
    identifying one or more visual objects in the captured video;
    associating one of the isolated sound sources with one of the identified visual objects;
    playing the captured video and audio;
    receiving an input identifying one of the isolated sound sources during the playing of the captured video and audio, wherein the input includes a command;
    responsive to receiving the input, modifying an attribute of the playing of the identified isolated sound source, modifying the attribute including changing pitch of the continuously isolated sound source as the visual object first moves towards then away from the relative position of the user to simulate a Doppler effect.

11. The computer program product of claim 10 wherein the identifying one or more visual objects in the captured video includes identifying a visual object associated with the isolated sound source.

12. The computer program product of claim 10, wherein the isolating the sound source and identifying a direction of arrival of the sound source with respect to the capture location further comprises:

applying a beamforming algorithm to audio signals received by two or more microphones at the capture location thereby forming a beam pattern in which a sound source located in the beam pattern is isolated with respect to sound sources outside of the pattern.

* * * * *